Oct. 8, 1929.  H. E. ADAMS  1,731,089
ARTIFICIAL FLOWER
Filed March 30, 1928
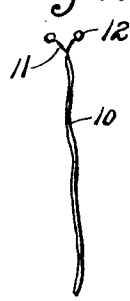
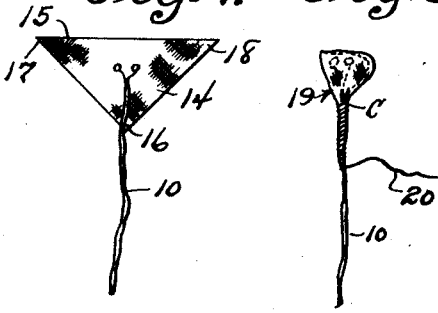
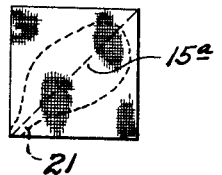
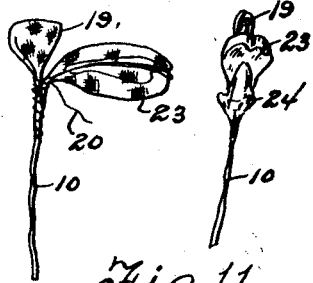
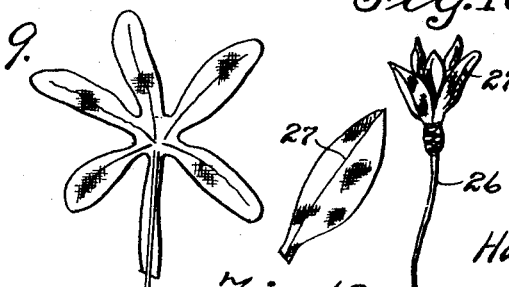
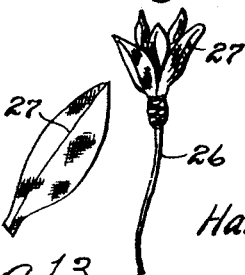
Harriet E. Adams
INVENTOR
BY Victor J. Evans
ATTORNEY Patented Oct. 8, 1929

1,731,089

UNITED STATES PATENT OFFICE

HARRIET E. ADAMS, OF SAN ANTONIO, TEXAS

ARTIFICIAL FLOWER

Application filed March 30, 1928. Serial No. 266,000.

The present invention relates to the process of making artificial flowers and has for its objects to provide a novel process by which the making of such flowers as blue-bonnets or lupines or other legumes may be facilitated and simplified.

In the drawings:

Figure 1 shows a completed group of flowers as lupines after being constructed in accordance with my invention and formed into one stalk.

Figure 2 illustrates the product of the first step in making up a flower in accordance with my method.

Figure 3 shows a square of material from which a part of the flower is to be cut.

Figure 4 shows the square folded on the diagonal line shown in Figure 3 with the wire and stamen shown in Figure 2 placed thereupon and ready for attachment thereto.

Figure 5 shows the same after attachment.

Figure 6 shows a square of material with a petal outlined thereon.

Figure 7 shows the petal fully formed.

Figure 8 shows the petal and attached to the combination shown in Figure 5.

Figure 9 shows a fully formed leaf.

Figure 10 is a whorl of leaves of a different character.

Figure 11 is a blank from which a calyx may be formed.

Figure 12 shows the calyx in place.

Figure 13 is an individual leaf of the character used in the whorl illustrated in Figure 10.

In making artificial flowers in accordance with my process, take a strip of white organdie or other suitable material of suitable width, cut a square 14 and fold the same on the bias through the center to form a triangle shape piece as shown in Figure 3, with the corners even, now take the wire 10 which has had previously attached thereto, stamens 11 and 12, or the stamens may be formed with the ends of the wire by looping the ends upon themselves in rounded formation, hold this wire between the thumb and fore finger of the left hand and with the right hand take the square shown in Figure 3 which has been folded on the line 15 and place it against the wire 10 as illustrated in Figure 4 keeping the bias edges 15 upward and extending slightly above the head of the stamens as illustrated, with one corner of the square 14 so folded resting on the wire at the apex 16 of the triangle so formed. Now bring the corners 17 and 18 together below the point C in Figure 5, hold these corners and the apex together tightly with the remaining portion of the material around the stamens and with the right hand wrap the lower end of the triangle adjacent the apex 16, with thread 20 about the wire 10 thus enclosing the stamens 11 and 12 with the material, and forming a hood or crown 19 as illustrated in Figure 5 using preferably a wrapping of white thread for securing the hood 19 to the wire, after wrapping leave a portion of the thread loose as shown.

To make the petal number 23 represented complete in Figure 7, cut a square from a strip of white organdie of suitable width and fold as in Figures 3 and 4, trim off three corners of the square and shape as shown in Figure 7. After the petal is so shaped put in a double crease or inverted pleat through the entire center of the petal on the folded line 15$^a$ in order to form the substantially bonnet configuration in the following manner.

Twist the sharp end 21 of petal 23 slightly, holding the petal in the left hand between the thumb and fore finger, catch hold on under side of petal at a point about midway between the ends, keeping it on the center fold with the edges even. Now with the thumb and fore finger of the right hand open out the petal without releasing the left hand hold:—hold taut and press in an inverted pleat 22 or double crease through the entire center of petal. The petal may then be attached to the hood or crown as follows:

Take the hood 19 in the left hand, hold it sidewise with back of hood toward you, take the petal 23 in the right hand and place the pointed end 21 on wire stem 10 close up to the hood 19, keeping the crease therein directly under center front of the hood and wrap the same thread 20 which was previously left loose thereabout as shown in Figure 8. This completes the attaching of the parts of the flower, the petal must now be pressed together slightly to give it the bonnet shape, which is done by pressing the petal between the thumb and fore finger as above set forth. It is then ready to be painted with water colors to suit the taste.

The calyx may or may not be used. When used, cut two sections like number 24, Figure 11 from sage green organdie and place paste on the lower edge 25 and place the sharpest end of one section well up on the back of the hood of the flower and directly in the center with the pasted end of calyx around the stem of the flower at the lower part of hood. Press out smoothly and arrange second half of calyx on the opposite side as shown in Figure 12 and to a position so as to bring the pointed end directly over crease in pedal on the under side with lower edges of front sections of the petal meeting back portion of the calyx at corners and smooth out pasted ends nicely.

The leaf may be made as follows: Place a white sheet of tissue paper over a drawn leaf design and with a lead pencil trace around the design correctly. Cut out the pattern about the pencil line and pin it onto squares of sage green organdie of suitable dimensions, thence cut out the leaves from the organdie.

The leaf material may first be pasted on one side, doubled to give thickness and allowed to dry before cutting the leaves therefrom. Then cut as directed by the outline furnished by the pattern. Attach a small wire to each leaf for a stem. The leaves may be cut in a number of sizes and shapes as shown in Figures 9 and 13, those illustrated in Figure 13 may be attached in small groups to fine individual wires, while a number of leaf sections being grouped together and these in turn attached to a main stem 26. Each section of the leaves are creased through the center as at 27 to represent veining, a representation of a whorl of leaves of this character is represented in Figure 10.

To make the bud, cut 1 inch squares of sage green organdie and fold like Figure 3 and fold three times in same manner. Take a piece of fine wire of suitable length and make a small loop in one end then take up one of the folded squares of green organdie and pinch the lower edge tightly together like gathers, and wrap it with thread around the upper end of the wire. Take another of these squares, treat it in the same manner and wrap it securely to the wire stem enclosing the loop in end of stem. Wrap three more of these folded squares or petals around this stem making 5 in all which completes the bud, the bud constituting a foundation to which the flowers and leaves may be attached.

In attaching the flowers to the bud, I use about 18 flowers to the bunch. The flowers are wrapped onto the bud stem one at a time using green floss for wrapping, wrapping white centered flowers on at the top of the bunch and rose centered flowers at the bottom and all around stem from left to right.

Water colors may be used to give the color effect and for this purpose, use a small camel's hair brush for painting and paint the hood first all over. Paint the petal so as to leave a white or pink unpainted strip in center of petals.

A teacup or bowl makes a good dryer around the inner rim of which to suspend the flowers by their petals to dry after painting them. Paint each flower one at a time before wrapping their stems. Wrap all stems with green floss, raffia etc. After wrapping, bend the stem of each bluebonnet from the hood of the flower and tilt same backward to give the proper position.

Foliage may be used only when desired. Satin or taffeta silk may also be used to make the flowers and leaves and the painting done with oil paint. After the petals are painted as directed elsewhere, and allowed to dry, then the red and white centers may be painted on the hoods and petals instead of being left plain.

Paper flowers may be made by using blue crepe paper and pasting on white and pink centers after cutting the squares and before the crease is put in the petal, allow to dry then crease and proceed as directed. Stamens may or may not be used.

Having described my invention which I claim is:—

1. The process of making artificial flowers of a leguminous type, consisting in cutting material in the shape of a square, folding the square material on a diagonal line between two diametrically opposite corners to form a triangle shape piece, taking a piece of wire to provide a stem and having artificial stamens thereon, placing the wire across the apex of the triangle piece with the stamens arranged above the center thereof, folding the corners opposite the apex together about the wire with the material around the stamens, wrapping the apex and corners with thread in a manner to provide a hood secured to the wire, leaving a portion of the thread loose, cutting a petal shaped piece from a square of material and creasing the same in substantially bonnet shape, securing the creased petal to the wire adjacent the hood by wrapping the loose piece of thread about a portion of the petal and wire, forming leaves and grouping the latter with stems having hoods and petals secured thereto and securing the grouped leaves and stems together.

2. A process of making artificial flowers of a leguminous type, consisting in folding a square shape piece of material on a diagonal line between two diametrically opposed corners to form a triangle shape piece, taking a piece of wire, looping the ends of said wire to simulate stamens, placing the wire across the apex of the triangle piece with the stamens arranged above the center thereof, folding the corners opposite the apex together about the wire with the material around the stamens, wrapping the apex and corners with thread to form a hood, leaving a portion of the thread loose, cutting a petal shaped piece from a square of material and creasing the same in substantially bonnet shape, securing the petal shape piece to the wire adjacent the hood by wrapping the loose piece of thread about a portion of the petal shape piece and wire, forming leaves and grouping the leaves with stems having hoods and petals secured thereto and securing the grouped leaves and stems together.

In testimony whereof I affix my signature.

HARRIET E. ADAMS.